UNITED STATES PATENT OFFICE.

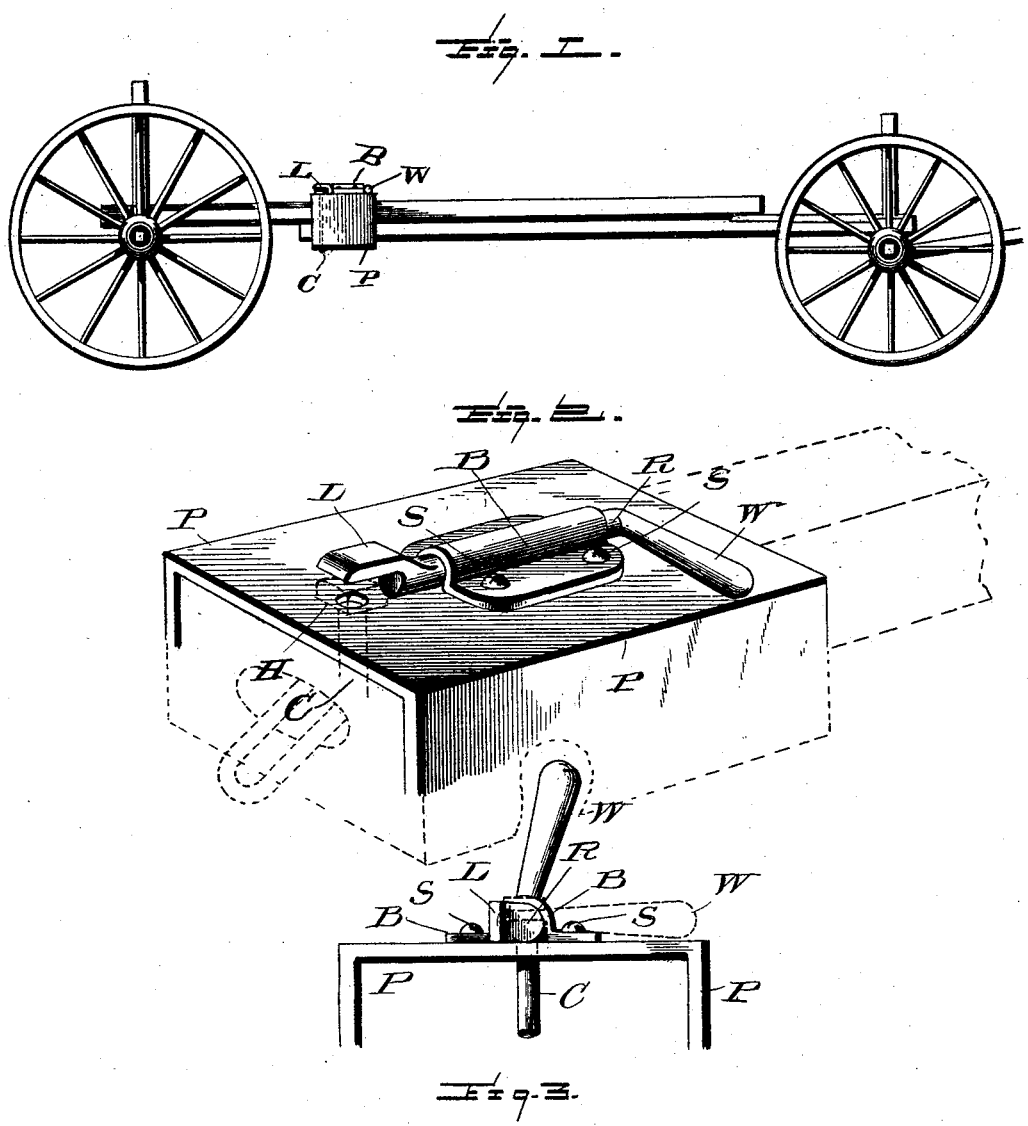

JOHN V. SMITH, OF HAYES, ILLINOIS.

PIN-LOCK.

SPECIFICATION forming part of Letters Patent No. 489,272, dated January 3, 1893.

Application filed August 27, 1892. Serial No. 444,315. (No model.)

*To all whom it may concern:*

Be it known that I, JOHN V. SMITH, a citizen of the United States, residing at Hayes, in the county of Douglas and State of Illinois, have invented certain new and useful Improvements in Pin-Locks; and I do hereby declare the following to be a full, clear, and exact description of the invention, such as will enable others skilled in the art to which it appertains to make and use the same.

This invention is a pin lock adapted to hold from accidental displacement a coupling pin or any other pin requiring a safety lock. It is capable of use in a number of instances, one of which is upon the coupling pin which connects the reach of a wagon with the plate or plates at the front ends of the rear hounds, and between which the reach passes.

The object of the invention is to provide a device by which a coupling pin will be prevented from becoming jarred out of position; and this object I accomplish by constructing my improved pin lock substantially as hereinafter more fully described and claimed, and as illustrated on the accompanying sheet of drawings, wherein—

Figure 1 is a side elevation of the running gear of a wagon, showing my improved lock as used to hold the coupling pin thereof in position. Fig. 2 is an enlarged perspective view of the lock itself mounted on the plate of the reach-coupling of Fig. 1 (or, as shown in dotted lines, on the draw-head of a car coupling), and illustrating the coupling pin in dotted lines as retained in place by said lock. Fig. 3 is an end elevation of the parts shown in full lines in Fig. 2, the handle of the lock being shown in full lines as raised and in dotted lines to hold the pin in place.

In numerous instances in machinery it is desirable to use a pin to couple parts together, such pin generally passing vertically through aligned holes in the parts and having a head at its upper end which prevents its falling through and out. If the lower end of the pin has a nut, it becomes a bolt, but such nut is sometimes undesirable because the jar and rattle of parts tends to dislodge the nut, after which the same jar will not unfrequently cause the pin to jump from its seat and disconnect the parts at inopportune moments. One instance where such objection arises is in the couplings between the reach and the rear hounds of wagons, and a device has been heretofore patented employing a sliding and spring-actuated catch or bolt whose tip moves over the head of the pin to hold the latter in place. In the present case I employ an oscillating or rocking shaft having a (preferably weighted) handle at one end and a lip at the other end which moves over the head of the pin; and, although I have illustrated and described the lock as applied to the coupling pin of a wagon, it is to be understood that I reserve the right to use it elsewhere—as in dotted lines in Fig. 2, for instance, where I have shown how the device can be applied to the draw-head of a car coupling.

Referring particularly to the drawings, the letter P designates a plate (in Fig. 1 it is the plate at the front ends of the rear hounds and through which the reach moves: in Fig. 2 it may be the draw-head of a car coupling), and B is a box secured to this plate by rabbets or screws S, or by brazing. Journaled in and through the box B is a rock-shaft R having at one end a handle W standing at right angles, or thereabout, to the length of the shaft, and preferably having considerable weight. The other end of the shaft is formed with a lip L deflected laterally from one side of the shaft as best seen in Fig. 2, and standing out from the longitudinal center of said shaft at a point a little over ninety degrees from the radial line of the handle W.

C designates the coupling pin, here passing down through the plate P and having a head H which prevents its falling through. The parts are of metal, and of any desired proportions.

In use, the coupling pin is passed down through the plate P until its head rests thereon around the hole, and at this time the coupling—whatever it is—is accomplished. In Fig. 1 the shank of the pin then passes through one of a number of holes which are formed in the reach, and above and below said reach it passes through holes in the top and bottom plates of the box at the front end of the rear hounds; but in other constructions and uses this may be different. To permit such insertion of the pin, my improved pin lock must be turned as seen in full lines in Fig. 3, at which time the shank and head of the pin may readily pass by the lip L. But when the latter rests upon the plate P the weighted handle W is raised not quite to a vertical position, and hence when released by the operator this handle automatically descends to the position shown in Fig. 2. Such movement turns the rock shaft in its bearing or box B, and causes the lip L to turn over the head H of the coupling pin. Thereafter the rattling or jar of parts may cause the handle to rise slightly from the plate P, but it will hardly assume the position shown in Fig. 3 in full lines—that is, its highest possible position—and even if it did, there must be just at this moment a violent additional jar to cause the coupling pin to jump from its seat. At all other times the lip L stands above the head H of the pin C, and hence the latter cannot become dislodged by the jar. To remove the coupling pin, the handle W is raised and the pin withdrawn by hand, the lip L then standing aside to permit it.

I do not claim a bolt adapted to be moved over the head of the pin: neither do I claim a sliding or swinging member to be used for this purpose: but What I do claim is—

1. The herein described pin lock consisting of a rock shaft having a handle at one end and a lip at the other end, said lip being deflected laterally from and radially to the longitudinal line of the shaft, as and for the purpose set forth.

2. The herein described pin lock consisting of a box, a rock shaft journaled therein, a handle on said shaft and radial thereto, and a lip at one end of the shaft deflected from the longitudinal line thereof on a radial line different from that occupied by the handle, as and for the purpose set forth.

3. In a pin lock, the combination with a plate and a headed coupling pin passing down through the same; of a box secured on the plate, a rock shaft journaled through the box, a handle at one end of the shaft standing radial thereto, and a laterally deflected lip at the other end of the shaft adapted to be turned over the head of said pin by the weight of the handle, the edge of the lip striking the plate before the handle reaches a vertical position, as and for the purpose set forth.

4. In a pin lock, the combination with a plate, and a coupling pin passing through the same; of a box secured to the plate, a rock shaft journaled in said box, means for holding said shaft normally in one position, and a laterally deflected lip on the shaft standing over the end of the pin when the shaft is in normal position, as and for the purpose set forth.

In testimony whereof I affix my signature in presence of two witnesses.

JOHN V. SMITH.

Witnesses:
J. W. KING,
W. T. JOHNSON.